United States Patent
Eberle et al.

(10) Patent No.: US 10,601,020 B2
(45) Date of Patent: Mar. 24, 2020

(54) BATTERY CELL, BATTERY, MOTOR VEHICLE

(71) Applicants: Robert Bosch GmbH, Stuttgart (DE); Samsung SDI Co., Ltd., Yongin-si, Gyeonggi-do (KR)

(72) Inventors: Felix Eberle, Ulm (DE); Alexander Reitzle, Neu-Ulm (DE); Berengar Krieg, Gerlingen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 419 days.

(21) Appl. No.: 14/364,323

(22) PCT Filed: Nov. 8, 2012

(86) PCT No.: PCT/EP2012/072126
§ 371 (c)(1),
(2) Date: Jun. 11, 2014

(87) PCT Pub. No.: WO2013/087304
PCT Pub. Date: Jun. 20, 2013

(65) Prior Publication Data
US 2014/0377603 A1 Dec. 25, 2014

(30) Foreign Application Priority Data

Dec. 15, 2011 (DE) .................... 10 2011 088 731

(51) Int. Cl.
*H01M 2/00* (2006.01)
*H01M 2/34* (2006.01)
*H01M 10/0525* (2010.01)
*H01M 2/04* (2006.01)
*H01M 10/42* (2006.01)

(52) U.S. Cl.
CPC ........... *H01M 2/345* (2013.01); *H01M 2/043* (2013.01); *H01M 2/0473* (2013.01); *H01M 2/34* (2013.01);
(Continued)

(58) Field of Classification Search
CPC ............. H01M 10/0525; H01M 10/42; H01M 2/0217; H01M 2/043; H01M 2/0473;
(Continued)

(56) References Cited

U.S. PATENT DOCUMENTS 6,497,978 B1    12/2002   Takada et al.
7,501,197 B2 *   3/2009   Kim .................... H01M 2/0413
                                                                 429/53
(Continued)

FOREIGN PATENT DOCUMENTS

CN    101887986 A    11/2010
CN    102136562 A    7/2011
(Continued)

OTHER PUBLICATIONS

International Search Report corresponding to PCT Application No. PCT/EP2012/072126, dated May 6, 2013 (German and English language document) (5 pages).

*Primary Examiner* — Nicholas P D'Aniello
(74) *Attorney, Agent, or Firm* — Maginot, Moore & Beck LLP

(57) ABSTRACT

A battery cell includes a membrane configured to curve outwards when pressure inside the battery cell increases, thereby creating an electrically conductive connection between two poles. A conductor is arranged on an outside of the membrane and is connected to the battery cell such that the outward-curving membrane lifts the conductor from the membrane on one side such that the poles are electrically connected to one another via the conductor.

14 Claims, 4 Drawing Sheets

(52) U.S. Cl.
CPC ....... *H01M 10/0525* (2013.01); *H01M 10/42* (2013.01); *H01M 2200/20* (2013.01); *H01M 2220/20* (2013.01); *Y02E 60/122* (2013.01); *Y02P 70/54* (2015.11); *Y02T 10/7011* (2013.01)

(58) Field of Classification Search
CPC .......... H01M 2/34; H01M 2/345; H01M 2/00; H01M 2220/20; H01M 2200/20; Y02T 10/7011; Y02E 60/122; Y02P 70/54
See application file for complete search history.

(56) References Cited

U.S. PATENT DOCUMENTS

| | | | |
|---|---|---|---|
| 2010/0227205 A1* | 9/2010 | Byun | H01M 2/0237 429/61 |
| 2010/0279162 A1* | 11/2010 | Chun | H01M 2/0404 429/94 |
| 2010/0291421 A1* | 11/2010 | Byun | H01M 2/043 429/61 |
| 2011/0183197 A1* | 7/2011 | Byun | H01M 2/04 429/185 |

FOREIGN PATENT DOCUMENTS

| | | |
|---|---|---|
| EP | 2 226 868 A1 | 9/2010 |
| EP | 2 259 364 A1 | 12/2010 |
| EP | 2 299 512 A1 | 3/2011 |
| EP | 2 348 559 A1 | 7/2011 |
| JP | 5-62664 A | 3/1993 |

\* cited by examiner

BATTERY CELL, BATTERY, MOTOR VEHICLE

This application is a 35 U.S.C. § 371 National Stage Application of PCT/EP2012/072126, filed on Nov. 8, 2012, which claims the benefit of priority to Serial No. DE 10 2011 088 731.8, filed on Dec. 15, 2011 in Germany, the disclosures of which are incorporated herein by reference in their entirety.

The present disclosure relates to a battery cell comprising a safety membrane, which is configured to curve outwards in the event of an increase in pressure within the battery cell and to thus produce an electrically conductive connection between the two poles.

In addition, the disclosure relates to a battery which comprises a plurality of the battery cells according to the disclosure, and to a motor vehicle comprising the battery.

BACKGROUND

It would appear that, in the future, new battery systems will be used both in stationary applications, such as wind turbines, in motor vehicles in the form of hybrid or electric motor vehicles and in electronic appliances, such as laptops or mobile telephones, with very stringent requirements being placed on said battery systems in respect of reliability, safety, performance and life.

In vehicles with an at least partially electric drive, electrical energy stores are used in order to store the electrical energy for the electric motor which assists the drive or acts as drive. In vehicles of the most recent generation, in this case so-called lithium-ion batteries are used. These batteries are distinguished, inter alia, by high energy densities and an extremely low level of self-discharge. Lithium-ion cells have at least one positive and one negative electrode (cathode and anode, respectively), and the lithium ions (Li+) can be reversibly intercalated or deintercalated again.

FIG. 1 shows how individual battery cells 10 can be combined to form battery modules 12 and then batteries 14. This is performed by the poles of the battery cells 10 being connected in parallel or series (not illustrated). In this case, by definition, a battery module 12 or a battery 14 comprises at least two battery cells 10, wherein the terms battery 14 and battery module 12 are often used synonymously. The electrical voltage of a battery 14 is, for example, between 12 and 750 volts DC.

For authorization for transport and for use in motor vehicles, various tests are implemented on battery cells, for example lithium-ion battery cells. Inter alia, so-called abuse tests are also implemented in order to be able to assess the response of the battery cells under extreme situations, such as a traffic accident, for example.

In order to diminish the consequences of some abuse tests, mechanisms are installed in the battery cells which interrupt a current flow into the battery cell when the cell-internal pressure increases owing to abuse of the battery cell. For example, current interruptive devices (CID) or overcharge safety devices (OSD) are known.

U.S. Pat. No. 6,497,978 B1 discloses a possible embodiment of a mechanical current interruption. A safety mechanism is installed between the positive pole of a cylindrical battery cell and the positive electrode, which is electrically conductively connected to the positive pole. If the pressure within the battery cell increases, first a cover within the battery cell is deformed, as a result of which the electrically conductive connection between the positive pole and the positive electrode is interrupted. When the pressure further increases, battery gases can escape into the open air via a burst film.

JP 5062664 A discloses another variant of a mechanically activated safety device. The likewise cylindrical battery cell has an electrically conductive membrane at the cell cover of its positive pole. This membrane can expand in the event of a pressure increase within the battery cell and thereby makes contact with an overhang fastened on the battery cell housing, which overhang, as is the battery cell housing, is at the potential of the negative pole. By virtue of the contact of the membrane with the overhang, the battery cell is short-circuited as a result of which further overcharging is stopped, for example.

FIG. 2 shows a similar mechanism of an overcharge safety device using the example of a prismatic battery cell 10. Said battery cell comprises a likewise electrically conductive membrane 22, which is integrated in the electrically conductive battery cell housing 16 and is curved inwards in the fault-free state. Furthermore, the battery cell 10 comprises a pole 24 (in this case the negative pole) which is electrically insulated from the battery cell housing 16 and a pole 25 (in this case the positive pole) which is electrically conductively connected to the battery cell housing 16. The electrical insulation between the insulated pole 24 and the battery cell housing 16 is ensured via an insulator 28, whereas the connected pole can be, for example, part of the battery cell housing 16 or inserted therein. If the battery cell 10 is being charged, a charge current $I_C$ flows via the positive pole into the chemically active part 18 of the battery cell 10.

If the pressure within the battery cell 10 now increases, for example as a result of overcharging of the battery cell 10, the membrane 22 curves outwards, as illustrated in FIG. 3, and comes into electrically conductive contact with an overhang 26 on the insulated pole 24 of the battery cell 10. As a result, the two poles 24, 25 are electrically conductively connected to one another. The resistance of this electrically conductive connection is sufficiently low for an overcharge current $I_{DC}$ to no longer flow through the chemically active part 18, but through the battery cell housing 16, the membrane 22 and the overhang 26.

At the same time, however, a short circuit of the battery cell 10 via the two poles 24, 25 results. A short-circuit current $I_{SC}$ flows via the membrane 22 and the cell housing 16 and could in the process destruct the membrane 22. In order to prevent this, a fuse 20 is installed between the chemically active part 18 and one of the poles 24, 25, in this case the positive pole, which fuse interrupts the short-circuit current $I_{SC}$ before it can destroy the membrane 22.

SUMMARY

In accordance with the disclosure, a battery cell comprising a membrane is provided. The membrane is configured to curve outwards (in the direction facing away from the battery cell) in the event of an increase in pressure within the battery cell and thus to produce an electrically conductive connection between the two poles. A characteristic feature consists in that a conductor is arranged on the outer side (on that side remote from the battery cell) of the membrane and is connected to the battery cell in such a way that, by virtue of the membrane curving outwards, the conductor is lifted off from the membrane on one side, with the result that the poles are electrically conductively connected to one another via the conductor.

Normally, one of the poles is electrically insulated from the battery cell housing (insulated pole), while the other pole is electrically conductively connected to the battery cell housing (connected pole). The insulated pole is, for example, the negative pole, as a result of which the pole which is connected to the battery cell housing is the positive pole. However, battery cells are also known in which the polarity is reversed.

A contact point for the conductor which has lifted off from the membrane can represent, for example, an overhang protruding from the insulated pole. This overhang at the same time also forms the end stop for the lifted conductor. In practice, the interaction between the membrane and the conductor can be dimensioned such that the electrically conductive connection between the two poles is provided above a certain pressure within the cell. This pressure is reached, for example, as a result of overcharging of the battery cell, in the case of 60 Ah battery cells typically at a state of charge of 150%.

The disclosure is based on the knowledge of decoupling the individual functions of the membrane from one another. In previous battery cells, this is reliable for the detection of a high internal pressure of the battery cell, and for the production of a conductive connection between the two poles and for the current transfer of the charging current and short-circuit current. By isolating the functions and transferring the function of current conduction by the conductor, the possibility is provided of monitoring the short-circuit current of the battery cell in a manner other than by means of a fuse within the battery cell. This makes it possible to implement an overcharge safety device without a fuse. As a result, there is no risk of a high short-circuit current which may be present of a plurality of series-connected battery cells within a battery cell needing to be interrupted, which may not be possible without arcs.

This decoupling of the functions is in particular provided when a preferred electrical insulator is arranged between the safety membrane and the conductor, with the result that a possible current between the two battery poles must flow through the conductor. This current is the entirety of that current which is flowing between the two poles outside of the chemically active part of the battery cell after production of the electrically conductive connection between said two poles. The insulator can consist of plastic, for example, or can be in the form of a coating of the membrane and/or of the conductor.

For example, when using the battery cell according to the disclosure in a motor vehicle, impacts or vibrations can be transferred to the battery cell. This can result in undesired movement of the conductor, as a result of which unintentional contact-making between the conductor and the overhang can take place. In order to prevent this, an anti-vibration means can prevent possible oscillation of the conductor. Said anti-vibration means prevents the conductor from oscillating in a form-fitting and/or friction-fitting manner, but can be overcome easily enough in the event of an expansion of the membrane outwards.

Further preferably, the membrane has such a rigidity that the membrane is curved in the normal state in the direction towards the interior of the battery cell and, when there is sufficient internal pressure in the battery cell, suddenly folds over outwards. This property is useful, for example, when overcoming the anti-vibration means, since this characteristic of the flap-over membrane assists in overcoming the anti-vibration means.

Preferably, the conductor is a sheet-metal strip. This represents a simple and at the same time cost-effective implementation of the conductor.

Furthermore, the conductor is preferably welded at one end to the battery cell, in particular preferably to the battery cell housing, in order to represent a good and permanent electrical contact with the cell housing. Thus, the conductor can be configured to be flexible so as to make contact with the overhang. The further the fastening point of the conductor is away from the membrane, the larger the lever is in order to be lifted off by the membrane.

Further preferably, the battery cell is a lithium-ion secondary cell. Lithium-ion secondary cells are characterized by a high energy and power density, which in particular results in further advantages in the sector of electromobility.

Furthermore, a battery comprising a plurality of the battery cells according to the disclosure is provided.

In addition, a motor vehicle or motor vehicle device comprising the battery according to the disclosure is provided, wherein the battery module is generally provided for feeding an electrical drive system of the vehicle. The motor vehicle device can be a battery-operated multimedia device, for example.

Advantageous developments of the disclosure are specified and set forth in the description.

BRIEF DESCRIPTION OF THE DRAWINGS

Exemplary embodiments of the disclosure will be explained in more detail with reference to the drawings and the description below. In the drawings.

DETAILED DESCRIPTION

Figure 1:
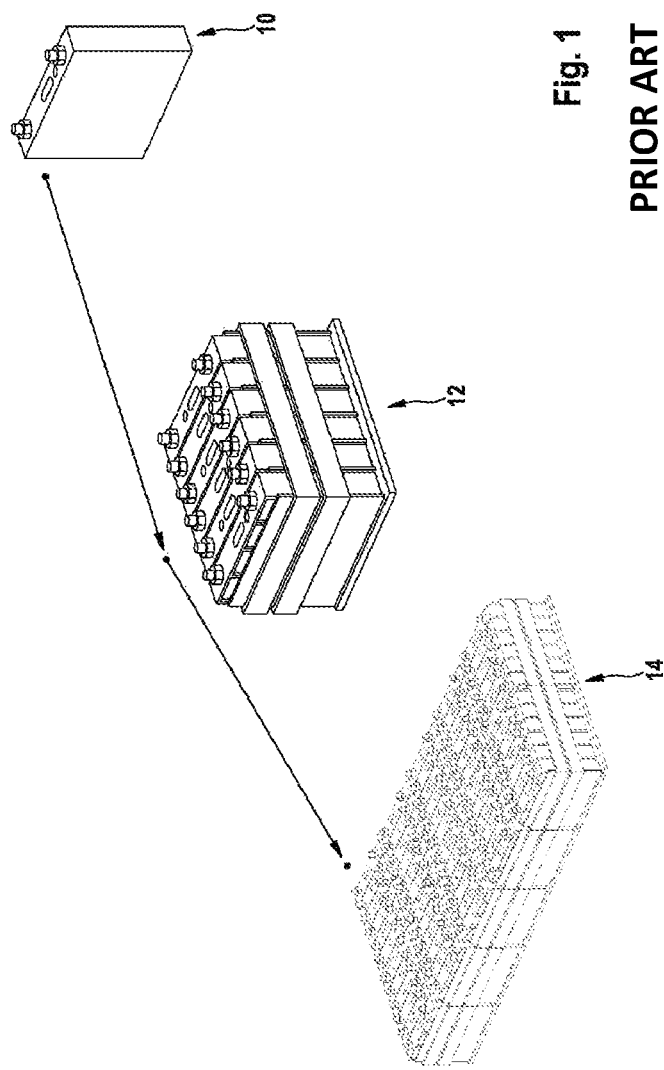
FIG. 1 shows a battery cell, a battery module and a battery (prior art)
Figure 2:
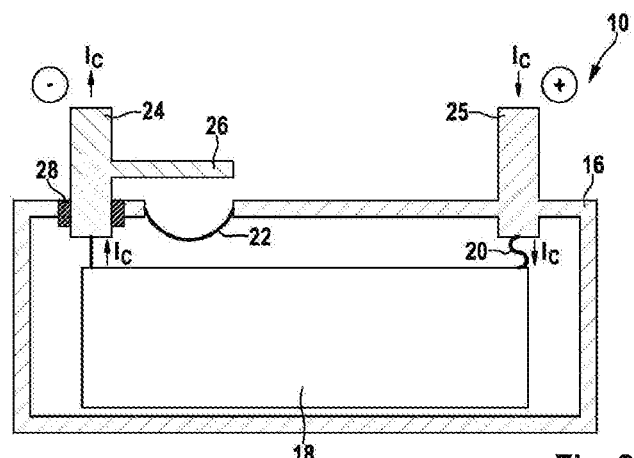
FIG. 2 shows a battery cell comprising an overcharge safety device comprising mutually isolated poles (prior art)
Figure 3:
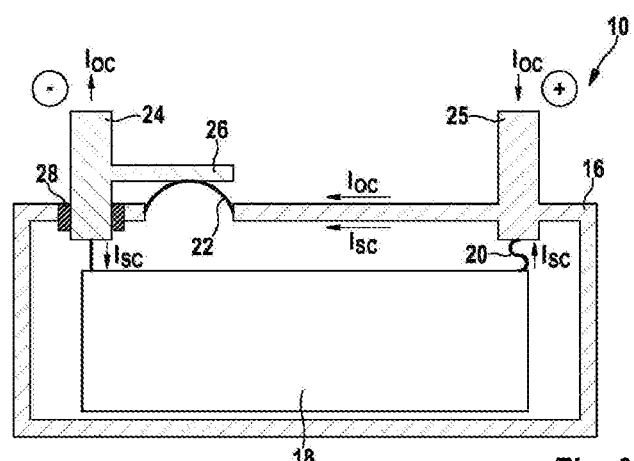
FIG. 3 shows a battery cell comprising an overcharge safety device comprising poles connected to one another (prior art)

Details have already been given in relation to FIGS. 1, 2 and 3 for illustrating the prior art.

Figure 4:
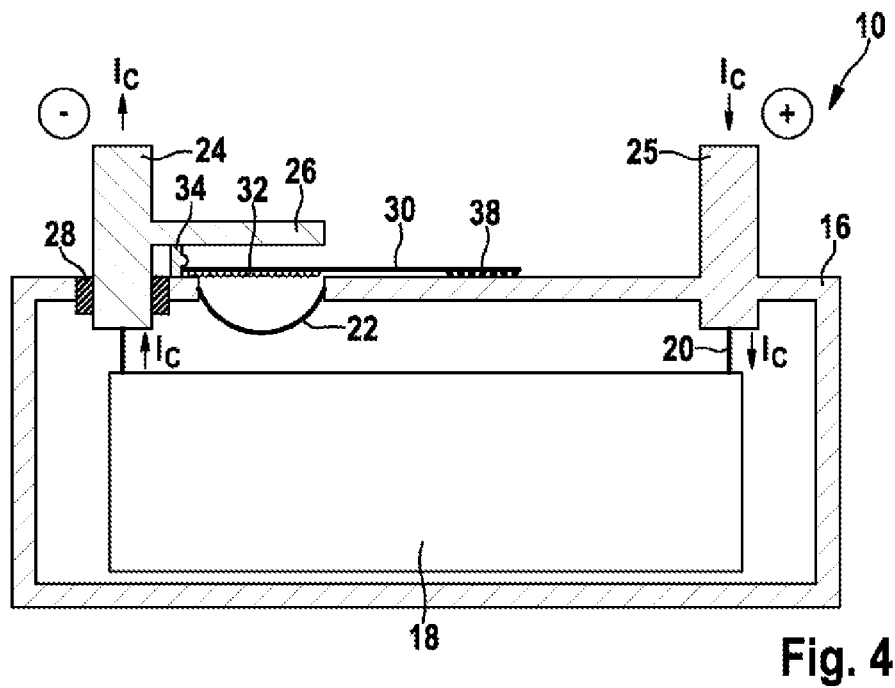
FIG. 4 shows a battery cell according to the disclosure comprising an overcharge safety device comprising poles isolated from one another.
Figure 5:
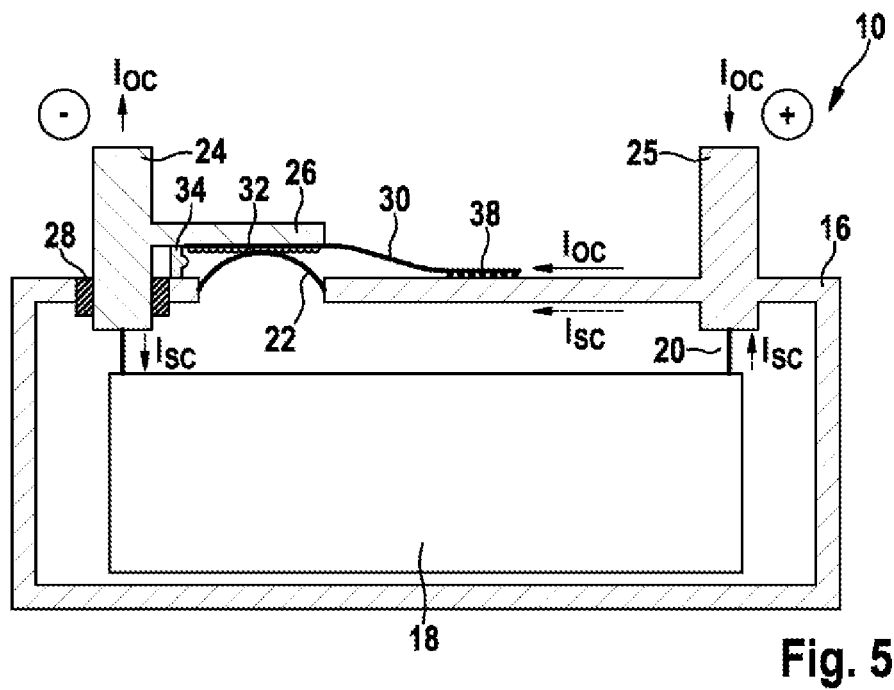
FIG. 5 shows a battery cell according to the disclosure comprising an overcharge safety device comprising poles connected to one another.

FIG. 4 shows a simplified cross section through a battery cell 10 according to the disclosure. As already known from the prior art shown in FIGS. 2 and 3, the battery cell 10 comprises a pole 24 (for example the negative pole) which is electrically insulated from the battery cell housing 16 and a pole 25 (for example the positive pole) which is connected to the battery cell housing 16. The electrical insulation of the insulated pole 24 from the battery cell housing 16 can be ensured, as illustrated, via an insulator 28, whereas the pole 25 which is connected to the battery cell housing 16 can be, for example, part of the battery cell housing 16 or can have been inserted into said battery cell housing. The poles 24, 25 are electrically conductively connected to the chemically active part 18 of the battery cell 10. On the outer side of the membrane 22, a conductor 30 is arranged over said membrane, which conductor is electrically conductively connected to the battery cell housing 16 on one side in a connection point 38 (for example a welded joint). The insulated pole 24 has an overhang, which is in the form of an end stop for the conductor 30. An insulator 32 can be arranged between the conductor 30 and the membrane 22, for example on the conductor 30.

Owing to vibrations of the battery cell 10, for example during operation in a vehicle, an anti-vibration means 34 can be required. Said anti-vibration means prevents vibrations of the conductor 30 and therefore undesired contact between the conductor 30 and the overhang 26. The anti-vibration means 34 can be shaped and arranged, for example, in such a way that a movement of the conductor 30 is suppressed in a form-fitting manner. At the same time, it is necessary to ensure that the membrane 22 is capable of lifting the conductor 30 off given a provided pressure within the battery cell 10, and of producing a contact between the conductor 30 and the overhang 26 by means of elastic deformation of the conductor 30 or of the anti-vibration means 34, for example.

If the battery cell 10 is being charged, a charge current $I_C$ flows via the positive pole and into the chemically active part 18 of the battery cell 10. The two poles 24, 25 are electrically conductively connected to the chemically active part 18, as described, wherein, in contrast to the prior art, it is possible to dispense with a fuse 20 in the interior of the battery cell 10.

If abuse of the cell now takes place, in which the pressure within the battery cell 10 increases, for example as a result of overcharging, the membrane 22 curves outwards. If the membrane 22 has sufficient rigidity and is curved inwards in the normal state shown in FIG. 4, said membrane folds over suddenly with sufficient pressure. By virtue of the membrane 22 curving outwards, the conductor 30 is lifted off on one side, for example bent and pressed against the overhang 26. The force exerted by the membrane 22 is in this case sufficient for overcoming an advantageously provided anti-vibration means 34. By virtue of the contact between the conductor 30 and the overhang 26, the two poles 24, 25 are electrically conductively connected to one another.

The electrical resistance of the electrically conductive connection between the two poles 24, 25 should be small enough for the total overcharge current $I_{OC}$ to flow via this electrically conductive connection, as illustrated, and therefore to no longer arrive in the chemically active part 18. At the same time, the resistance should also be large enough, however, for only a controlled short-circuit current $I_{SC}$ to flow in order that the battery cell 10 cannot be critically heated by said current. The required resistance which meets these two criteria can be determined by experimentation.

If no insulator 32 is provided and if the electrical resistance of the series circuit comprising the overhang 26, the conductor 30 and the battery cell housing 16 is lower than the electrical resistance of the series circuit comprising the overhang 26, the conductor 30, the membrane 22 and the battery cell housing 16, already the majority of the current $I_{OC}+I_{SC}$ flows via the conductor 30. As a result, in comparison with the prior art, damage to the membrane 22 is already less probable, as a result of which the fuse 20 can be dispensed with. If, however, the total current flows via the conductor 30, the abovementioned insulator 32 can be arranged between the membrane 22 and the conductor 30. This makes it possible to adjust the resistance of the electrical connection between the two poles 24, 25 in a targeted manner via the conductor 30.

Figure 6:
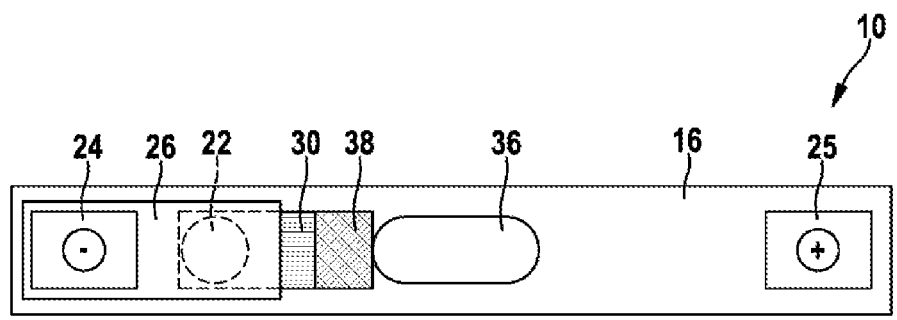
FIG. 6 shows a possible form of the conductor.

FIG. 6 shows a possible form of the conductor 30. Said conductor can be configured as a sheet-metal strip and is arranged between a safety vent 36 and the pole insulated from the battery cell housing 16. The conductor 30 is connected, at one of its ends, to the battery cell housing 16 at a connection point 38. The connection point 38 can be realized, for example, in the form of a welded joint. In order to keep the required forces for lifting up the conductor 30 low, it is expedient to select the distance between the connection point 38 and the center point of the membrane 22 to be as large as possible. As a result, only an insubstantial amount of excess force expenditure is required in comparison with constructions without a conductor 30 by the membrane 22 when lifting the conductor 30. Therefore, the characteristic of the membrane 22 is only changed insubstantially in comparison with the prior art.

Figure 7:
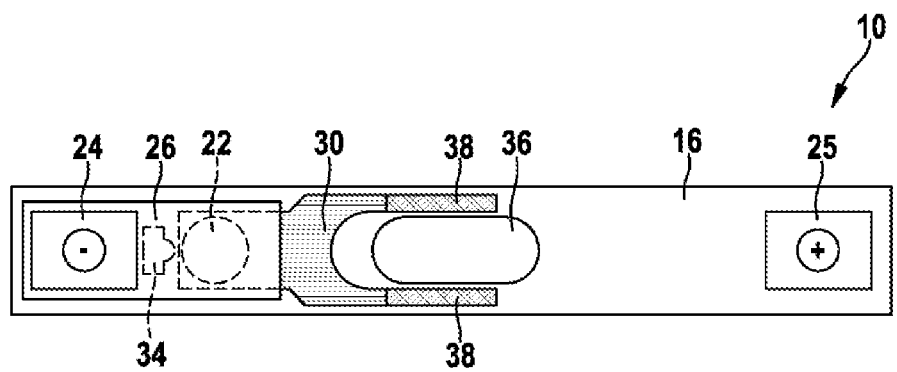
FIG. 7 shows a further possible form of the conductor.

FIG. 7 shows an approach for providing an even greater distance between the connection point 38 and the center point of the membrane 22 in the case of battery cell housings 16 with a safety vent 36 in accordance with the prior art. The conductor 30 in the form of a sheet-metal strip is guided in fork-shaped fashion around the safety vent 36 for this purpose. The connection points 38 are now no longer located between the membrane 22 and the safety vent 36, but next to the safety vent 36. Owing to the greater distance between the connection point 38 and the center point of the membrane 22, the conductor 30 is lifted more reliably by the membrane 22 given otherwise identical parameters in comparison with FIG. 6. In addition, the tripping characteristic of the overcharge safety device is only slightly changed in comparison with the prior art.

The invention claimed is:

1. A battery cell, comprising:
   a battery cell housing that includes a membrane configured to curve outwards in response to an increase in pressure within the battery cell;
   a first pole electrically conductively connected to the battery cell housing;
   a second pole electrically insulated from the battery cell housing;
   a conductor that is disposed in direct contact with an outer side of the battery cell housing, that is electrically conductively connected to the battery cell housing, and that is configured such that as the membrane curves outward, the membrane lifts at least one side of the conductor off from the battery cell housing and into direct contact with the second pole to electrically conductively connect the second pole to the first pole; and
   an anti-vibration member configured to engage the conductor in at least one of a form-fitting and friction-fitting fashion to inhibit oscillation of the conductor.

2. The battery cell as claimed in claim 1, further comprising:
   an electrical insulator positioned between the membrane and the conductor such that a current between the two poles flows through the conductor.

3. The battery cell as claimed in claim 1, wherein the conductor is a sheet-metal strip.

4. The battery cell as claimed in claim 1, wherein the conductor is connected to the battery cell via at least one welded joint.

5. The battery cell as claimed in claim 4, wherein the conductor is connected to the battery cell housing via at least one welded joint.

6. The battery cell as claimed in claim 1, wherein the battery cell is a lithium-ion secondary cell.

7. A battery, comprising:
   a plurality of battery cells, each of the battery cells including:
   a battery cell housing that includes a membrane configured to curve outwards in response to an increase in pressure within the battery cell;

a first pole electrically conductively connected to the battery cell housing;

a second pole electrically insulated from the battery cell housing;

a conductor that is disposed in direct contact with an outer side of the battery cell housing, that is electrically conductively connected to the battery cell housing, and that is configured such that as the membrane curves outward, the membrane lifts at least one side of the conductor off from the battery cell housing and into direct contact with the second pole to electrically conductively connect the second pole to the first pole; and an anti-vibration member configured to engage the conductor in at least one of a form-fitting and friction-fitting fashion to inhibit oscillation of the conductor.

8. A motor vehicle, comprising:

a battery including a plurality of battery cells, each of the battery cells including:

a battery cell housing that includes a membrane configured to curve outwards in response to an increase in pressure within the battery cell;

a first pole electrically conductively connected to the battery cell housing;

a second pole electrically insulated from the battery cell housing; and a conductor that is disposed in direct contact with an outer side of the battery cell housing, that is electrically conductively connected to the battery cell housing, and that is configured such that as the membrane curves outward, the membrane lifts at least one side of the conductor off from the battery cell housing and into direct contact with the second pole to electrically conductively connect the second pole to the first pole; and an anti-vibration member configured to engage the conductor in at least one of a form-fitting and friction-fitting fashion to inhibit oscillation of the conductor.

9. The battery cell as claimed in claim 1, wherein the battery cell is configured such that the conductor contacts the second pole to electrically conductively connect the second pole to the first pole in response to the battery cell reaching an overcharging condition of at least 150%.

10. The battery cell as claimed in claim 1, wherein the membrane, in an initial position prior to the increase in pressure within the battery cell, is curved inward toward an interior of the battery cell.

11. The battery cell as claimed in claim 10, wherein the inward curve of the membrane is configured to fold over outwards from the interior of the battery cell to lift the at least one side of the conductor off of the membrane in response to the pressure within the battery cell being above a predetermined threshold pressure.

12. The battery cell as claimed in claim 1, wherein the conductor is further configured to elastically deform in response to the membrane curving outward to override the anti-vibration member and enable the at least one side of the conductor to come into direct contact with the second pole.

13. The battery as claimed in claim 7, wherein the conductor is further configured to elastically deform in response to the membrane curving outward to override the anti-vibration member and enable the at least one side of the conductor to come into direct contact with the second pole.

14. The motor vehicle as claimed in claim 8, wherein the conductor is further configured to elastically deform in response to the membrane curving outward to override the anti-vibration member and enable the at least one side of the conductor to come into direct contact with the second pole.

* * * * *